May 30, 1933.    R. P. LANSING    1,911,453
BRAKE MECHANISM
Filed May 24, 1930    2 Sheets-Sheet 1
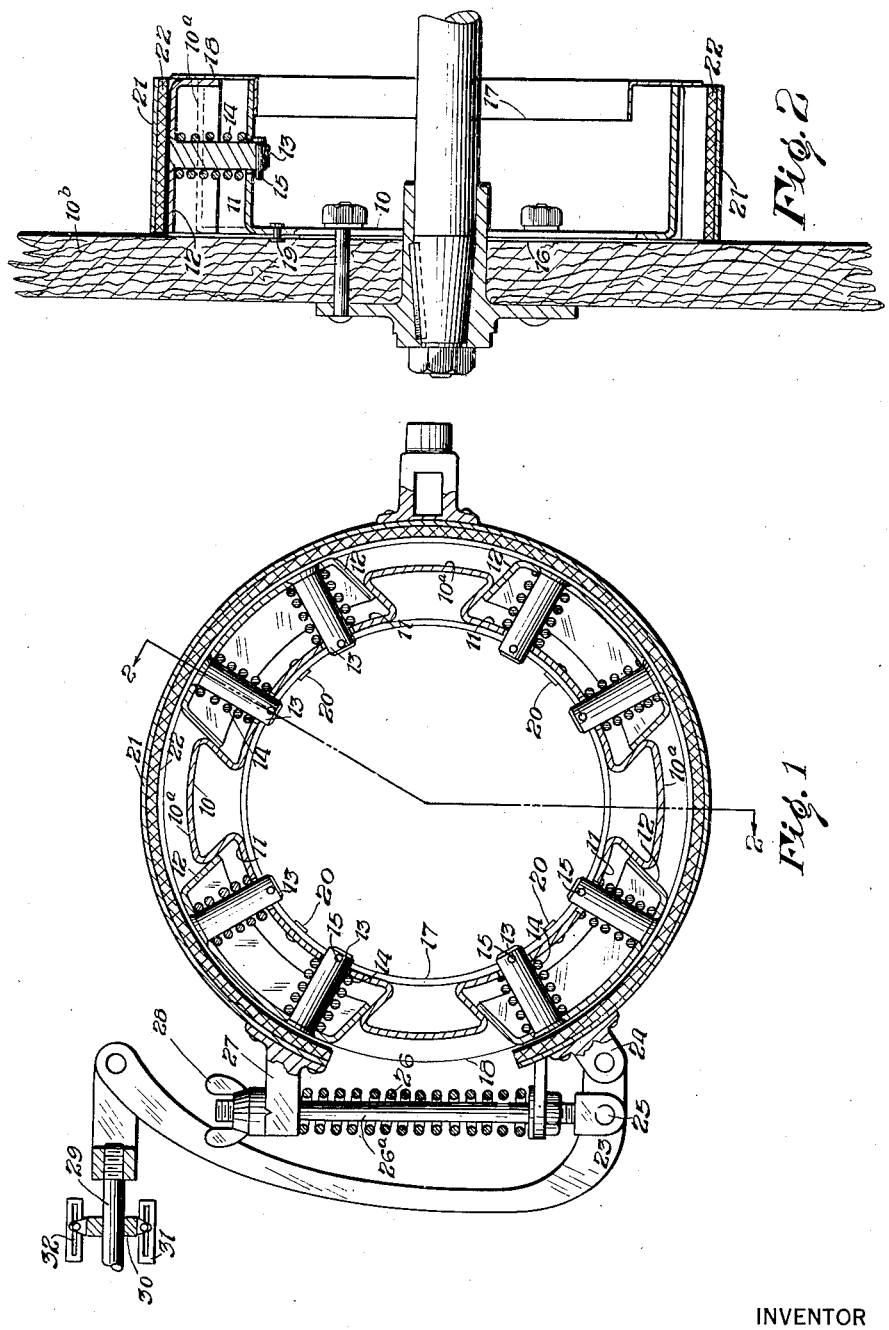
INVENTOR
Raymond P. Lansing
BY J. B. Smith
ATTORNEY May 30, 1933.  R. P. LANSING  1,911,453
BRAKE MECHANISM
Filed May 24, 1930  2 Sheets-Sheet 2

INVENTOR
*Raymond P. Lansing*
BY
*F. B. Smith*
ATTORNEY

Patented May 30, 1933

1,911,453

UNITED STATES PATENT OFFICE

RAYMOND P. LANSING, OF MONTCLAIR, NEW JERSEY, ASSIGNOR, BY MESNE ASSIGNMENTS, TO BENDIX AVIATION CORPORATION, OF SOUTH BEND, INDIANA, A CORPORATION OF DELAWARE

BRAKE MECHANISM

Application filed May 24, 1930. Serial No. 455,303.

The present invention relates to brake mechanism and more particularly to novel means whereby braking action is obtained by frictional engagement between a rotatable member and a fixed member.

An object of the invention is to provide in a brake mechanism, novel means whereby the tendency of said mechanism to lock is eliminated.

Another object is to provide a brake mechanism embodying novel means for limiting the braking pressure between a rotatable drum and a cooperating fixed brake band or shoe to a predetermined torque value.

A further object is to provide in a brake, novel mechanism including stop means functioning with a rotatable brake drum whereby the applied braking pressure is predetermined and is preferably made less than the traction between the member carrying the drum, such as a wheel, and the surface on which said member operates.

Still another object is to provide a mechanism of the class including novel means operating with a rotatable drum, said means being resiliently held in frictional engagement with a cooperating fixed brake band or shoe when the band or shoe is actuated, thereby preventing locking of said drum and band.

Other objects and advantages of the invention will appear more fully hereinafter from the following detailed description taken together with the accompanying drawings which illustrate one embodiment of the invention. It is to be expressly understood, however, that the drawings are for the purpose of illustration and description only, and are not designed as a definition of the limits of the invention, reference being had for this purpose to the appended claims.

In the drawings, wherein like reference characters refer to like parts throughout the several views:

Fig. 1 is a sectional elevation taken through the plane of one form of brake mechanism of the external type embodying the invention;

Fig. 2 is a cross-sectional view taken on the line 2—2 of Fig. 1;

Figure 4:
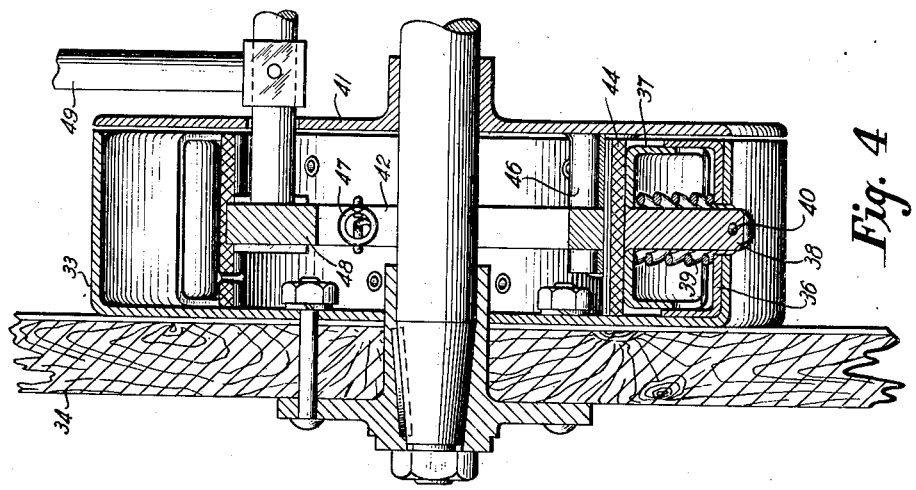
Fig. 4 is a cross sectional view taken on the line 4—4 of Fig. 3.

Referring more particularly to the drawings, the embodiment of the invention illustrated in Figs. 1 and 2 shows a form of external contracting brake embodying the principles of the invention and comprises a rotatable drum 10 adapted to be carried by a vehicle wheel $10^b$ to which the braking action is to be transmitted. The drum 10 is provided with peripheral recesses 11 which may be equally spaced throughout the circumference of the drum and arranged in diametrically opposed relation. Brake shoes 12 are mounted in the recesses 11 by means of pins or guide rods 13, the latter being attached to the brake shoes and arranged for radial movement relative to the drum 10. The brake shoes 12 are adapted to be compressed into the recesses 11 but normally are projected out of said recesses by means of coil springs 14 coiled about each of the rods or pins 13. Pins 15 extending through the free end of the rods 13 prevent the latter from being forced out of the recessed portion of the drum by the action of springs 14.

A disc 16 and a collar 17 having a peripheral flanged portion 18 are attached to the drum 10 by means of rivets 19 and 20, respectively, or any other suitable fastening means, to prevent transverse motion of the brake shoes 12 when the drum is rotated with the wheel.

A brake band 21 lined with suitable brake lining 22 surrounds or encircles the brake shoes 12 and is adapted to be contracted or actuated into frictional engagement with said brake shoes by means of a lever 23 pivotally attached to the band at 24. Although the band is adapted to be moved into engagement with the drum, it is considered as being fixed relative to the drum, in that the band remains stationary relative to the vehicle carrying the brake mechanism to which the band is attached, while the drum may be rotated with the wheel.

The lever 23 is fulcrumed at 25 so that it may actuate the band against a coil spring 26, one end of which abuts a fixed and stationary member 27 which is attached to the other end of the brake band. Adjustment of the tension on the spring 26 may be made by means of a butterfly nut 28 threaded on rod 26ª. The other end of the lever 23 is pivotally connected to a brake rod 29 which may be actuated from any suitable foot or hand controlled mechanism (not shown).

It is highly desirable that certain types of brakes be so constructed as to prevent locking of the drum. This is particularly true of brakes for use on aircraft or automobiles. In the case of airplanes, "nosing-over" may occur if the brakes lock, with likelihood of injury to the plane and passengers. In the present invention this objectionable result is avoided by limiting the braking pressure developed between the drum and band or shoe to a predetermined torque value. If the novel brake is applied to an airplane, for example, a torque value is selected which is substantially equal to or less than the maximum tractive effort of the airplane wheel along the ground. To this end the strength of springs 14 is selected of a value such that when the band 21 is engaged with the shoes 12, the latter are yieldable to a predetermined extent so that a very slight amount of slippage is obtained whereby locking of the two is prevented and means are provided for limiting the contraction or movement of the band. The limiting means may assume various mechanical embodiments, but in the form shown said means are constituted by a member 30 through which the brake rod 29 is movable and against which the shoulder of the brake rod is adapted to abut. Adjustment of the member 30 relative to the shoulder of the brake rod may be made by means of slotted plates 31 and 32 to which the member 30 is attached.

Figure 3:
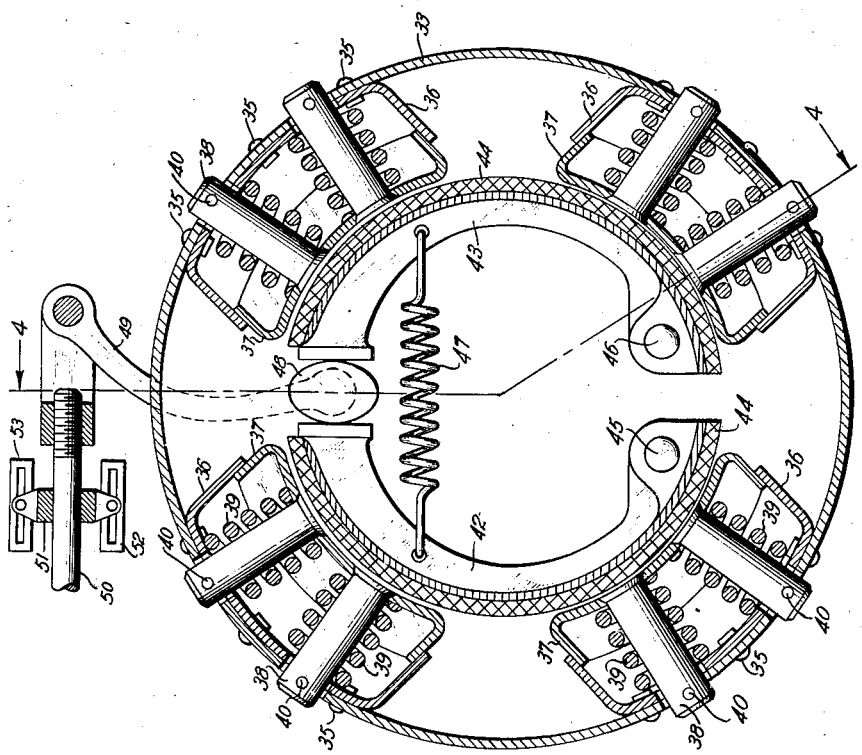
Fig. 3 is a sectional elevation taken through the plane of one form of brake mechanism of the internal expanding type embodying the invention.

While the embodiment illustrated in Figs. 1 and 2 shows an external contracting brake wherein a brake band is actuated into engagement with shoes or drum sections 12, the invention may be applied to an internal expanding brake one form of which is shown in Figs. 3 and 4 wherein brake shoes are actuated into engagement with the rotatable drum.

The operation of the mechanism in Figs. 1 and 2 is as follows: When the drum is rotating the fixed brake band 21 is normally out of engagement with the brake shoes or drum sections 12 which extend radially from the peripheral recesses 11 and beyond the periphery 10ª of the drum by the action of the spring 14. When the braking pressure is to be applied the rod 29 is moved to the left (horizontally in the plane of the drawings) causing the lever 23 to move the pivoted connection 24 toward the fixed member 27 against the tension of the coil spring 26, thereby contracting the band 21 and causing it to engage the brake shoes or drum sections 12. A firm locking grip of the brake band 21 on the brake shoes 12 is, however, prevented by the coil springs 14 which hold the brake shoes resiliently against the band, thereby preventing locking of the mechanism. To insure against possible locking of the shoes against the band, which might happen if the brake shoes were fully compressed into the recesses 11 and firmly seated therein thereby obtaining an effect similar to a solid drum without any yielding effect, the stop 30 is provided to limit the travel of the rod 29 whereby full contraction of the band 21 and full compression of the brake shoes or drum sections 12 into the recesses is prevented.

Referring now to Figs. 3 and 4, the embodiment of the invention illustrated therein is shown applied to a brake mechanism of the internal expanding type and comprises a rotatable drum 33 adapted to be carried by a vehicle wheel 34 to which the brake action is to be transmitted. Secured to the inner periphery of the drum 33, in any suitable manner as by means of rivets 35, are a plurality of cup-shaped members 36 which may be equally spaced throughout the circumference of the drum and arranged in diametrically opposed relation. The cup-shaped members 36, in the present embodiment, correspond to the peripheral recesses 11 of the embodiment illustrated in Figs. 1 and 2 and are the full equivalent thereof. The drum sections or brake shoes 37 which correspond to the brake shoes 12 of Fig. 1, are mounted in a similar manner to the cup-shaped members 36 by means of pins or guide rods 38, the latter being attached to the brake shoes or drum sections as by riveting and arranged for radial movement relative to the drum 33. The drum sections 37 are adapted to be compressed into the cup-shaped members 36 but normally are projected out of said members by means of coil springs 39 coiled about each of the rods or pins 38. Pins 40 extending through the free end of the rods 38 prevent the latter from being forced out of the cup-shaped members 36 of the drum by the action of the springs 39.

A disc or cover plate 41 is non-rotatably mounted on the wheel axle and positioned adjacent the open side of the drum 33, and is secured to the chassis of the vehicle carrying the brake mechanism in any suitable manner (not shown). It also serves as a support for the actuating mechanism which operates the brake. This prevents any transverse play or motion of the drum sections or brake shoes 37 when the drum is rotated with the wheel.

A pair of friction members 42 and 43 which are lined with suitable brake lining 44, are pivotally mounted on the disc 41 as by means of pins 45 and 46 secured to or formed integral with the disc. They are adapted to be actuated into frictional engagement with the drum section 37 against the tension of a spring 47 by means of a cam member 48 which is secured to and operated by a lever 49. Although the friction members 42 and 43 are adapted to be moved into frictional engagement with the drum sections, they are considered as being fixed relative thereto, i. e., they are non-rotatable. The opposite end of the lever 49 is pivotally connected to a brake rod 50 which may be actuated from any suitable foot or hand controlled mechanism (not shown).

In order to prevent the locking of the brake mechanism, the strength of the springs 39 is selected in the same manner as that of springs 14, shown in Figs. 1 and 2, so that when the friction members 42 and 43 are engaged with the shoes or drum sections 37, the latter are yieldable to a predetermined extent providing a very slight amount of slippage therebetween whereby locking of the members is prevented and means are provided for limiting the outward movement of the friction members 42 and 43. The limiting means may assume various mechanical embodiments, but in the form shown are similar to those illustrated in Fig. 1 and are constituted by a member 51 through which brake rod 50 is movable and against which the shoulder of the brake rod is adapted to abut. Adjustment of the member 51 relative to the shoulder of the brake rod may be made by means of slotted plates 52 and 53 to which the member 51 is attached.

The operation of the mechanism shown in Figs. 3 and 4 is somewhat similar to that of the mechanism illustrated in Figs. 1 and 2 and is as follows:

When the drum 33 is rotating, the stationary friction members 42 and 43 are normally held out of engagement with the drum sections 37 by means of the spring 47, and said sections extend radially from and slightly beyond the cup-shaped members 36 by the action of the springs 39. When the brake pressure is to be applied, the rod 50 is moved to the left, as viewed in the drawing, causing the lever 49 to move the pivoted friction members 42 and 43 against the tension of the spring 47, thereby causing them to engage the brake shoes or drum sections 37. A firm locking grip of the friction members 42 and 43 on the drum sections 37 is however prevented by the coil springs 39 which hold the drum sections resiliently against the friction members, thereby preventing locking of the mechanism. To insure against possible locking of the drum section against the friction members, which might happen if the drum sections were fully compressed into the cups 36 and firmly seated therein, thereby obtaining an effect similar to a solid drum without any yielding effect, the stop 51 is provided to limit the travel of the rod 50 whereby full expansion of the friction members 42 and 43 and full compression of the brake shoes or drum section 37 into the cups 36 is prevented.

A brake mechanism in accordance with the present invention is particularly adapted for use on wheels of landing gear of aircraft, where a locking of the brakes would cause a "nosing-over" of the craft, as hereinbefore explained. The mechanism is, of course, equally adaptable for use on automobiles or on any installation in which a braking action is to be applied to a rotatable member. For a definition of the limits of the invention reference will be had to the appended claims.

What is claimed is:

1. In a brake mechanism, the combination of a rotatable drum having a plurality of recesses equally spaced on its periphery, a plurality of radially compressible brake shoes mounted on said drum and adapted to be compressed into said recesses, each shoe comprising a segmental portion having a plurality of radial members extending inwardly of and slidably engaging said drum for guiding said segmental portions in their movements into said recesses, resilient means associated with each of said guide members for normally projecting said segmental portions outwardly from and beyond the periphery of said drum, and a brake band surrounding and engageable with said brake shoes for compressing the latter into said recesses against the pressure of said resilient means.

2. In a brake mechanism, the combination of a rotatable drum, a plurality of radially compressible brake shoes resiliently mounted on said drum, a brake band surrounding and circumferentially engageable with said brake shoes, means for actuating said band into engagement with said shoes, means for normally maintaining said shoes and said band out of engagement and means for limiting the actuation of said band whereby the compression of said brake shoes is limited to a predetermined extent to prevent the locking of the mechanism.

3. In a brake mechanism, the combination of a rotatable drum having a plurality of radially compressible peripheral brake shoes mounted thereon, resilient means normally maintaining said shoes extended outwardly from and beyond the periphery of said drum, and a brake band surrounding and engageable with said shoes for compressing the latter.

4. In a brake mechanism, the combination of a rotatable drum having a plurality of radial recesses on its periphery, a plurality of radially compressible brake shoes resiliently mounted on said drum and adapted to be compressed into said recesses, and a brake band surrounding and engageable with said shoes for compressing the latter into said recesses.

5. In a brake mechanism, the combination of a rotatable drum having a plurality of recesses on its periphery, a plurality of radially compressible brake shoes mounted on said drum and adapted to be compressed into said recesses, resilient means for normally maintaining said brake shoes projected outwardly from and beyond the periphery of said drum, and a brake band surrounding and engageable with said shoes for compressing the latter into said recesses against the pressure of said resilient means.

6. In a brake mechanism, the combination of a rotatable member, a brake member resiliently mounted on said rotatable member and adapted for radial movement relative thereto, and a second brake member surrounding said first brake member and adapted to be moved into engagement with the latter to produce frictional braking action.

7. In a brake mechanism, the combination of a rotatable member, a compressible brake member resiliently mounted on said rotatable member and adapted for radial movement relative thereto, and a second brake member adapted to be moved into engagement with said first brake member to compress the latter.

8. In a brake mechanism, the combination of a rotatable member, a compressible brake member resiliently mounted on the periphery of said rotatable member and adapted for radial movement relative thereto and normally extending outward beyond the periphery thereof, and a second brake member circumferentially engageable with said first brake member to compress the latter.

9. In a brake mechanism, the combination of a rotatable member, a plurality of compressible brake members resiliently mounted on the periphery of said rotatable member and adapted for radial movement relative thereto and normally extending outward beyond the periphery thereof, and another brake member circumferentially engageable with said compressible members to compress the latter.

10. In a brake mechanism, the combination of a rotatable drum, a plurality of brake shoes mounted on the periphery of said drum and adapted for radial movement relative thereto and normally extending outward beyond the periphery of said drum, a brake band surrounding said shoes and normally out of engagement but adapted to be moved into engagement with said brake shoes to produce frictional braking action, and means for resiliently holding said shoes against said band when the latter is moved into engagement therewith whereby locking of said mechanism is eliminated.

11. In a brake mechanism, the combination of a rotatable drum having a plurality of recesses equally spaced on its periphery, a plurality of radially compressible brake shoes mounted on said drum and adapted to be compressed into said recesses, each shoe comprising a segmental portion having a plurality of radially extending pins projecting inwardly of and slidably engaging said drum for guiding said segmental portions in their movements into said recesses, a spring coiled around each of said pins for normally projecting said shoes outwardly from and beyond the periphery of said drum, and a brake band surrounding and engageable with said brake shoes for compressing the latter into said recesses against the tension of said springs whereby resilient engagement is maintained between the brake band and shoes to eliminate locking of said mechanism.

12. In a brake mechanism, the combination of a rotatable drum having a plurality of recesses equally spaced on its periphery, a plurality of radially compressible brake shoes mounted on said drum and adapted to be compressed into said recesses, each shoe comprising a segmental portion having a plurality of radially extending pins projecting inwardly of and slidably engaging said drum for guiding said segmental portions in their movements into said recesses, a spring coiled around each of said pins for normally projecting said shoes outwardly from and beyond the periphery of said drum, a brake band surrounding and engageable with said brake shoes, means for moving said band into engagement with said shoes, and means for limiting the movement of said band to prevent said shoes from seating firmly in said drum recesses whereby locking of said mechanism is eliminated.

13. In a brake mechanism, the combination of a rotatable drum having a plurality of recesses on its periphery, a plurality of radially compressible brake shoes mounted on said drum and adapted to be compressed into said recesses, resilient means for normally maintaining said brake shoes projected outwardly from and beyond the periphery of said drum, a brake band surrounding and engageable with said shoes for compressing the latter into said recesses against the pressure of said resilient means, means for moving said band into engagement with said shoes and means for limiting such movement to a predetermined extent to prevent said shoes from firmly seating in said recesses whereby locking of said mechanism is eliminated.

14. In a brake mechanism, the combination of a rotatable drum having a plurality of recesses on its periphery, a plurality of radially compressible brake shoes mounted on said drum and adapted to be compressed into said recesses, resilient means for normally maintaining said brake shoes projected outwardly from and beyond the periphery of said drum, a brake band surrounding and engageable with said shoes for compressing the latter into said recesses against the pressure of said resilient means, means comprising a pivoted lever connected to said band and a rod for operating said lever to cause movement of said band into engagement with said shoes and means comprising a stop associated with said rod for limiting the movement of said band to a predetermined extent to prevent said shoes from firmly seating in said recesses whereby locking of said mechanism is eliminated.

15. A vehicle brake comprising a brake drum having peripheral recesses formed thereon, brake shoes resiliently mounted in said recesses and adapted for radial movement therein, and a brake band encircling said brake shoes for frictional engagement therewith.

16. A vehicle brake comprising a rotatable drum having a plurality of peripheral recesses formed therein, a plurality of brake shoes resiliently mounted in said recesses, said brake shoes being arranged to normally extend from said recesses and beyond the periphery of said drum, and a brake band encircling the drum and brake shoes for frictional engagement with said shoes.

17. A brake for vehicle wheels comprising a rotatable drum adapted to be mounted on a vehicle wheel and having a plurality of peripheral recesses formed therein, a brake band encircling said drum, brake shoes mounted in said recesses and adapted for radial movement relative to the brake drum, and means for resiliently holding said shoes against said band when the latter is contracted whereby locking of the brake is substantially eliminated.

18. In a brake mechanism, the combination of a rotatable brake drum having radially-movable sections, a non-rotatable brake member adapted to be moved into frictional engagement with said rotatable members, means for actuating said members into engagement to produce braking pressure therebetween, and means for limiting said braking pressure to a predetermined torque value to prevent locking of said mechanism.

19. In a brake mechanism, the combination of a rotatable brake member having radially-movable sections resiliently mounted therein, a non-rotatable brake member adapted to be moved into frictional engagement with said rotatable member, means for actuating said members into engagement to produce braking pressure therebetween, and resilient means for limiting said braking pressure to a predetermined torque value to prevent locking of said mechanism.

20. In a brake mechanism, the combination of a rotatable drum, a brake member fixed relative to the rotatable drum but adapted to be moved into frictional engagement therewith, means for actuating said brake member into engagement with said rotatable drum to produce braking pressure therebetween, resilient means cooperating with said drum and brake member to limit the said pressure to a predetermined torque value, and means associated with said actuating means for limiting the applied braking pressure to a value substantially equal to said predetermined torque value to prevent locking of said mechanism.

21. In a brake mechanism, the combination of a rotatable drum having a plurality of recessed members secured thereto and equally spaced throughout its periphery, a plurality of radially-movable drum sections mounted on said drum and adapted to be moved into said recessed members, each section comprising a segmental portion having a plurality of radial pins extending from and slidably engaging said drum for guiding said segmental portions in their movements relative to said recessed members, resilient means associated with each of said guide members for normally urging said segmental portions from said recessed members, and brake friction means engageable with the drum sections for compressing the latter into said recessed members against the pressure of said resilient means.

22. In a brake mechanism, the combination of a rotatable brake drum, a plurality of radially compressible brake sections resiliently mounted on said drum, a brake friction means circumferentially engageable with said brake sections, means for actuating said brake friction means into engagement with said sections, means for normally maintaining said sections and said brake friction means out of engagement, and means for limiting the actuation of said brake friction means whereby the compression of said brake sections is limited to a predetermined extent to prevent the locking of the mechanism.

23. In a brake mechanism, the combination of a rotatable brake drum having a plurality of radially compressible brake sections mounted thereon, resilient means normally urging said sections away from said drum, and non-rotatable brake friction means engageable with said brake sections for compressing the latter.

24. In a brake mechanism, the combination of a rotatable brake drum having a plurality of recessed members secured thereto, a plurality of radially compressible drum sections resiliently mounted on said drum and adapted to be compressed into said recessed members, and non-rotatable brake friction means engageable with said drum sections for compressing the latter into said recessed members.

25. In a brake mechanism, the combination of a rotatable member, a brake member resiliently mounted on said rotatable member and adapted for radial movement relative thereto, and a second brake member associated circumferentially with said first brake member and adapted to be moved into frictional engagement with the latter to produce frictional braking action.

26. A rotatable brake drum having radially-movable yieldingly-supported sections engageable with a non-rotatable brake friction means.

27. A rotatable brake drum having radially-movable yieldingly-supported sections.

28. A rotatable brake drum having spring supported sections engageable with a non-rotatable brake friction means.

29. A rotatable brake drum having spring supported sections.

30. A rotatable brake drum having slidingly mounted sections.

31. A rotatable brake drum having non pivotal independently yielding sections.

32. A rotatable brake drum having a series of guides and sections independently yieldingly supported on said guides.

33. A rotatable brake drum having a series of radial guides and arcuate drum sections independently yieldingly supported on said guides.

34. A rotatable brake drum having a series of guides and sections independently slidable on said guides.

35. A rotatable brake drum having a series of radial guides and arcuate drum sections independently slidable on said guides.

In testimony whereof I have signed this specification.

RAYMOND P. LANSING.